United States Patent Office 2,776,955
Patented Jan. 8, 1957

2,776,955

REACTION PRODUCT OF STABILIZED ROSIN AMINE WITH PHOSPHORUS PENTOXIDE

Ronald Rosher, Wilmington, Del., assignor to Hercules Powder Company, Wilmington, Del., a corporation of Delaware No Drawing. Application July 9, 1953,
Serial No. 367,116

7 Claims. (Cl. 260—100)

This invention concerns a resinous reaction product and more particularly the resinous reaction product produced by the reaction of stabilized rosin amine with phosphorus pentoxide.

In accordance with this invention it has been found that a resinous reaction product, relatively noncorrosive and having valuable antiwear properties, may be prepared by reacting stabilized rosin amine with phosphorus pentoxide. The product is an N-rosin phosphonamide. When an excess of stabilized rosin amine over about three moles per mole of phosphorus pentoxide is employed, the product contains in addition to the amide a quantity of free, stabilized rosin amine which can be isolated by distillation. If excess phosphorus pentoxide is employed, it remains undissolved and may be filtered from the reaction mixture. The quantities of stabilized rosin amine and phosphorus pentoxide employed and the conditions of temperature and pressure in carrying out the reaction are not critical and may be varied over a wide range without adversely affecting the reaction product. The reaction may be carried out by fusion or in a suitable solvent inert to the reactants such as benzene or xylene. When a solvent is utilized, its reflux temperature is a convenient temperature for the reaction.

The method of preparation of the resinous reaction product of this invention is illustrated by the following examples in which all parts and percentages are by weight.

*Example 1*

Phosphorus pentoxide in the amount of 36 parts and benzene in the amount of 1080 parts were charged into a reaction vessel fitted with a dropping funnel, a stirrer, and a reflux condenser. To this mixture was added with stirring 450 parts of disproportionated rosin amine dissolved in 405 parts of benzene. The addition was made over a period of 1 hour at reflux temperature. The reaction mixture was refluxed for 3½ hours and filtered. The benzene was removed by distillation under partial vacuum to produce a product having a phosphorus content of 3.1%, a drop softening point of 83° C., and an acid number of 60. The yield of the product was 482 parts.

*Example 2*

Using the apparatus of Example 1, 150 parts of disproportionated rosin amine dissolved in 135 parts of benzene was added to a refluxing stirred suspension mixture of 36 parts of phosphorus pentoxide in 450 parts benzene. The mixture was refluxed for 4 hours after completion of the addition. The product, isolated as in Example 1, contained 6.6% phosphorus and had a drop softening point of 174° C. The yield of the product was 171 parts.

*Example 3*

Using the apparatus of Example 1, 61 parts phosphorus pentoxide was added in about 10-part increments at 10-minute intervals to a stirred refluxing solution of 450 parts disproportionated rosin amine in 900 parts benzene. Refluxing was continued for 4 hours. The product, isolated in the manner of Example 1, contained 4.9% phosphorus, had a drop softening point of 130° C., and an acid number of 78. The yield of product amounted to 490 parts.

*Example 4*

To 450 parts disproportionated rosin amine which was heated to 160–170° C. there was added with stirring 61 parts phosphorus pentoxide over a period of 1 hour. The reaction mixture was maintained at 160–170° C. for an additional 3 hours with stirring. The reaction product was cloudy and contained particles of unreacted phosphorus pentoxide. The resin was dissolved in benzene and filtered to effect removal of suspended particles. The product which was isolated by distillation of the benzene under partial vacuum contained 5.5% phosphorus and had an acid number of 85, with a drop softening point of 147° C. The yield of resinous product was 510 parts.

*Example 5*

To 54 parts phosphorus pentoxide in a reaction vessel was added 867 parts benzene and 450 parts disproportionated rosin amine dissolved in 270 parts benzene. The mixture was stirred, heated to reflux and refluxed for 3½ hours. The solution of the reaction product was filtered and benzene distilled off at atmospheric pressure and finally under partial vacuum. The product had a drop softening point of 81° C. and contained 4.3% phosphorus. The yield of product amounted to 425 parts.

*Example 6*

A solution of 250 parts of rosin amine prepared from a rosin which had been hydrogenated to the extent of 98% on the basis of possible hydrogen absorption was dissolved in 450 parts benzene and added with stirring to a refluxing slurry of 80 parts phosphorus pentoxide in 450 parts benzene. The addition was carried out over a period of 40 minutes after which refluxing was continued for 4 hours. The solution was cooled and filtered and benzene distilled off under partial vacuum. The product had a melting point of 250° C. and contained 8.5% phosphorus.

*Example 7*

Following the procedure of Example 6 but utilizing 25 parts of phosphorus pentoxide, a product was prepared having a drop softening point of 65° C. and containing 3.6% phosphorus.

The stabilized rosin amines used in preparation of the reaction products of this invention are primary amines which may be prepared from a stabilized rosin such as dehydrogenated rosin, disproportionated rosin, heat-treated rosin, or hydrogenated rosin by first reacting with ammonia to form the nitrile and then hydrogenating the nitrile to the amine. The stabilized rosin amines may also be prepared from rosin by utilizing reaction conditions which will result in stabilization of the rosin nucleus. The step of making the nitrile may be carried out by passing gaseous ammonia into the molten rosin material and vaporizing the water as fast as it is formed or by heating the rosin material and ammonia in the presence of a dehydration catalyst. The nitrile is preferably purified by alkali extraction or by distillation to remove unconverted acids prior to hydrogenation to the amine, since acidic materials frequently destroy the activity of the hydrogenation catalyst. The hydrogenation of the nitrile may be carried out in the presence or absence of a solvent and in the presence or absence of ammonia. The catalyst may be any of the well-known hydrogenation catalysts such as Raney nickel, Raney cobalt, activated nickel, cobalt, palladium or platinum, etc., and supports may be used if desired. The hydrogenation is usually carried out under a pressure of about 200 to about 8000 pounds per square inch at a temperature of about 20° C. to about 200° C.

By the term "stabilized rosin amine" is meant a primary amine having a ring structure of a stabilized rosin acid such as dehydro-, dihydro-, tetrahydro- or polyabietic acid or a mixture of such primary amines. The term "stabilized rosin amine" of this invention, therefore, includes primary amines such as dehydrogenated rosin amine, disproportionated rosin amine, hydrogenated rosin amine, heat-treated rosin amine and also primary amines of rosin acids found in stabilized rosins, for example, dehydroabietyl amine, dihydroabietyl amine and tetrahydroabietyl amine. These rosin acids found in stabilized rosins, upon reaction with phosphorus pentoxide in accordance with this invention, produced particular species of this invention, for example, N-dehydroabietyl phosphonamide, N-dihydroabietyl phosphonamide and N-tetrahydroabietyl phosphonamide.

The rosin amine-phosphorus pentoxide reaction products of this invention are of particular interest because of their antiwear properties. Their addition to lubricants provides a convenient method for reducing the wear of moving parts in machinery. The resinous products of this invention are particularly useful in being relatively noncorrosive to copper and copper-containing materials.

Experimental work which has been carried out indicates the corrosive properties of the resinous products of this invention are a substantial improvement over prior art lubricant additives. In addition, the products of this invention exhibit superior antiwear properties.

In carrying out corrosion stability tests, a one-inch square of copper was submerged in 100 ml. portions of test fluids containing each of the additives to be compared. The test fluid comprised 3.9% by weight of acryloid HF–25 (a commercial viscosity index aid thought to comprise a polyacrylate or polymethacrylate) and 0.5% by weight of phenothiazine, dissolved in di-2-ethylhexyl sebacate. Air was bubbled through the test fluid at a temperature of about 250° F. for 168 hours, in a manner such that it contacted the copper square, the rate of air flow being about 10 liters per hour. The results are shown in Table I. Corrosion resulting from use of a mineral oil containing a commercial anticorrosion agent under the same conditions is also shown.

TABLE I

Loss of weight mg./sq. cm.

Test fluid + 5.0% disproportionated rosin amine- $P_2O_5$ reaction product _____ 0.39
Test fluid + 7.5% commercial lubricant additive which was a chloronaphtha xanthate contaiing 30–35% chlorine and 10–15% sulfur _____ 5.14
Test fluid + 5.0% commercial lubricant additive of the sulfurized terpene type containing 35% sulfur _____ 66.30
Grade M mineral oil fluid containing a commercial sulfur-chlorine type lubricant additive _____ 15.80

A second series of corrosion tests was carried out at a test temperature of about 347° F. over a period of 20 hours. Results of these comparative tests are shown in Table II.

TABLE II

Loss of weight mg./sq. cm.

Test fluid + 5.0% disproportionated rosin amine- $P_2O_5$ reaction product _____ 1.01
Test fluid + 7.5% commercial lubricant additive which was a chloronaphtha xanthate containing 30–35% chlorine and 10–15% sulfur _____ 10.23
Test fluid + 5.0% commercial lubricant additive of the sulfurized terpene type containing 35% sulfur _____ 136.00
Grade M mineral oil fluid containing a commercial sulfur-chlorine type lubricant additive ___ 9.68

The wear characteristics of a lubricant containing reaction products of this invention as compared with wear characteristics of the same lubricant containing a commercial additive are shown in Table III. The tests were carried out using a shell four-ball extreme pressure lubricant tester, the test time being one minute, the test temperature being 70–80° F., and the test speed being 1750 R. P. M. The test fluid for these tests was the same as the test fluid used for the corrosion tests of Tables I and II.

TABLE III

| Test Fluid Compositions in Wt. Percent | Approx. Load for Incipient Seizure, Kg. | Extreme Pressure Lubricant Tester (Average Wear Scar Diameter, mm., Steel-on-Steel Bearing Surfaces) | | | | | | |
|---|---|---|---|---|---|---|---|---|
| | | 40 Kg. | 60 Kg. | 80 Kg. | 120 Kg. | 160 Kg. | 200 Kg. | 240 Kg. |
| 5.0 Tricresyl Phosphate in Test Fluid. | 80 | 0.32 | 0.35 | 0.42 | Welded | | | |
| 5.0 Disproportionated Rosin Amine-$P_2O_5$ Reaction Product in Test Fluid (Ex. 4). | 80 | 0.33 | | 0.36 | 2.42 | 2.73 | 3.12 | Welded. |
| 5.0 60% Hydrogenated Rosin Amine-$P_2O_5$ Reaction Product in Test Fluid (3.4% phosphorus). | 70 | 0.31 | 0.37 | 2.25 | 2.38 | 2.73 | 3.16 | Do. |

The stabilized rosin amine-phosphorus pentoxide reaction products of this invention when utilized as antiwear agents in lubricants may be utilized in quantities ranging up to about 10% based on the weight of the lubricant. However, the quantity to be added in any particular instance is not critical, the maximum quantity being determined by the solubility of the resin in the particular lubricant utilized. Likewise, the minimum quantity is determined by the particular application and the conditions of heat and pressure to which the lubricant is to be subjected. Obviously, as temperature and pressure are increased, greater amounts of antiwear additives are desirable.

The antiwear products of this invention, although suitable for use in lubricants generally, are particularly suitable as an additive to synthetic lubricants, more particularly synthetic ester-type lubricants of the type di-2-ethylhexyl sebacate. Stabilized rosin amine-phosphorus pentoxide resins are useful in retarding wear of metals, such as steel, aluminum, magnesium, cadmium, etc., but are especially useful when incorporated in lubricants which contact copper or copper-containing materials.

What I claim and desire to protect by Letters Patent is:

1. The resinous product formed by heating a stabilized rosin amine with phosphorus pentoxide under substantially anhydrous conditions at a temperature between about 80° and about 170° C. for a length of time between about one hour and about five hours, the molar ratio of said amine to the phosphorus pentoxide varying from about 2:1 to about 10:1.

2. The product of claim 1 wherein the amine is disproportionated rosin amine.

3. The product of claim 1 wherein the amine is dehydrogenated rosin amine.

4. The product of claim 1 wherein the amine is hydrogenated rosin amine.

5. The method of forming a resinous reaction product which comprises heating a stabilized rosin amine with phosphorus pentoxide under substantially anhydrous conditions at a temperature between about 80° and about 170° C. for a length of time between about one hour and about five hours, the molar ratio of said amine to the phosphorus pentoxide varying from about 2:1 to about 10:1.

6. The method of claim 5 wherein the reaction is carried out by fusing the reactants.

7. The method of claim 5 wherein the reaction is carried out in an inert solvent.

References Cited in the file of this patent

UNITED STATES PATENTS

| | | |
|---|---|---|
| 2,138,852 | Butz | Dec. 6, 1938 |
| 2,262,813 | Morway et al. | Nov. 18, 1941 |
| 2,382,178 | Schilling et al. | Aug. 14, 1945 |
| 2,413,852 | Turner | Jan. 7, 1947 |
| 2,490,925 | Schertz | Dec. 13, 1949 |
| 2,492,939 | Schertz | Dec. 27, 1949 |
| 2,513,429 | Rosher | July 4, 1950 |
| 2,571,716 | Hess | Oct. 16, 1951 |

OTHER REFERENCES

Jr. Am. Chem. Soc., vol. 70, pages 2396–2400 (1948).

"Organo-Phosphorus Compounds," Kosolapoff, John Wiley and Sons, New York (1950), page 295.